(No Model.)
H. G. BADGLEY.
SEWER TRAP AND CESS POOL.
No. 325,231. Patented Sept. 1, 1885.
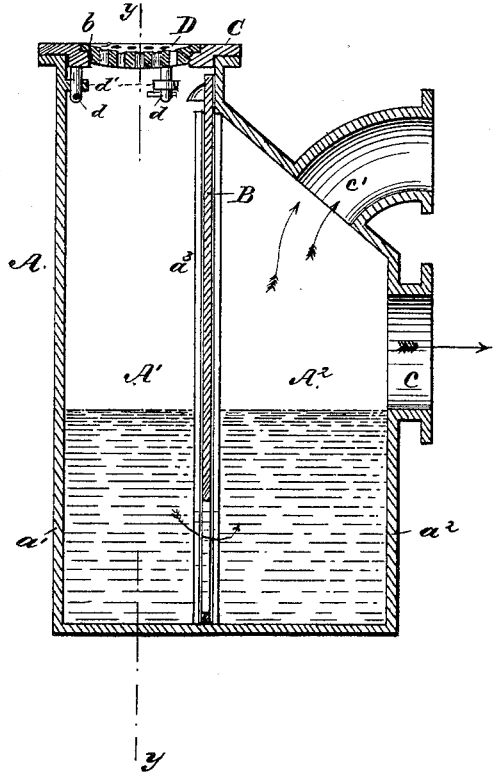
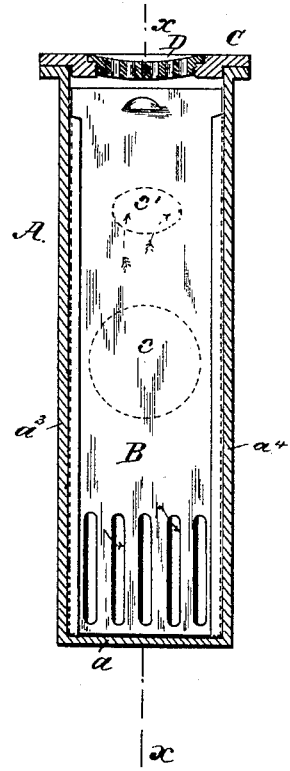

UNITED STATES PATENT OFFICE.

HOWARD G. BADGLEY, OF NEW YORK, N. Y.

SEWER-TRAP AND CESSPOOL.

SPECIFICATION forming part of Letters Patent No. 325,231, dated September 1, 1885.

Application filed September 15, 1884. (No model.)

*To all whom it may concern:*

Be it known that I, HOWARD G. BADGLEY, of the city of New York, in the county and State of New York, and a citizen of the United States of America, have invented a new and useful Improvement in Sewer-Traps and Cesspool-Boxes, of which the following is a specification, reference being had to the accompanying drawings, forming part of the same, in which—

Figure 1 is a vertical section of a trap or box embodying my invention on line $xx$, Fig. 2, and Fig. 2 is a vertical section of the same on line $yy$, Fig. 1, showing the partition hereinafter described in elevation.

My invention relates to water-traps connected with sewers or cesspool-boxes; and it consists in the combinations of devices hereinafter described and claimed.

A is the body of the trap, which may be of any suitable form or material. The one shown has a rectangular base, $a$, and vertical sides $a'$ $a^3$ $a^4$, the fourth side, $a^2$, being preferably vertical for a portion of its length, then extending in an oblique direction toward the side $a'$ for about half the width of the body of the trap, and then directly upward for a short distance until it reaches the height of the side $a'$. $a^3$ and $a^4$ are of a form and size adapted to inclose the space between $a'$ and $a^2$ and leave an aperture, $b$, at the top. The side $a^2$ is provided with an opening, $c$, preferably flanged, for connection with the sewer-pipe, and an opening, $c'$, above the opening $c$, for connection with the ventilating-leader, its position being preferably such that the ventilating-leader may extend therefrom slightly below the top of the trap.

B is a removable partition which extends from side to side of the body of the trap and reaches from the top of the trap to a point somewhat below the level of the opening $c$. It is fitted to form an air-tight joint with the top and sides of the trap. This is preferably secured by forming grooves in the side walls, $a^3$ $a^4$, as shown in Fig. 1, and partially filling said grooves with red lead before inserting the partition. I usually make the partition the full length of the trap and provide openings extending from below the level of opening $c$ to or near the bottom of the trap, as seen in Fig. 2. This partition, it is obvious, divides the body of the trap into two chambers, A' and A², having open communication at the bottom.

C is the cover, formed preferably with a rabbet around its edge, so that it will fit closely into and upon the top of the trap. This cover has a strainer, D, preferably provided with a screw-thread that screws into a threaded opening in said cover, and lugs $d$ $d'$ are formed on the under side of the cover of the trap, and also on the sides of the trap, the latter, $d'$, being pierced with holes and arranged in such relative positions to those on the cover, which have the form of pins, that said pins $d$ will fit into the holes in $d'$, where they may be secured by a pin or nut or any other suitable means.

The strainer D, being removable, enables a workman to easily reach and unfasten the cover from the trap when necessary, while it is securely attached at all other times, and the fastenings are entirely out of the way of persons passing over the trap, which is intended to be placed in the ground with the cover level with its surface.

Water entering into the trap through the strainer rises in both chambers until it reaches the level of the opening $c$, and thereafter flows off into the sewer, while all gas and foul odors are prevented by the water-seal at the bottom of the trap and the partition above it from passing into and escaping through chamber A', but naturally pass off through opening $c'$ in chamber A² to the ventilating-leader.

The partition B being easily removed permits the sewer-connection and the trap itself to be readily cleared of any obstruction without taking up the trap.

I do not limit myself to the exact form or arrangement of the parts, as they may be considerably varied without departing from the spirit of my invention.

What I claim as my invention, and desire to secure by Letters Patent, is—

1. The combination, with a sewer-trap provided with a lug or lugs on the inside near its top, of a cover having an opening adapted to receive a removable strainer and provided with means for securing said cover to the lugs inside of the trap, the same being so located as to be accessible through the opening in the cover, as and for the purpose specified.

2. A sewer-trap divided into two chambers, with open communication between them at or near one end, one of said chambers being provided with an inlet above the level of said opening, and the other chamber being provided with an outlet above the level of said opening and below the level of the inlet in the first chamber and a second outlet above the level of the first outlet, as and for the purpose specified.

3. A sewer-trap divided into two chambers by a removable partition, with open communication between them at or near one end, one of said chambers being provided with an inlet above the level of said opening, and the other chamber being provided with an outlet above the level of said opening and below the level of the opening in the first chamber, as and for the purpose specified.

4. A sewer-trap divided into two chambers by a removable partition, with open communication between them at or near one end, one of said chambers being provided with an inlet above the level of said opening, and the other chamber being provided with an outlet above the level of said opening and below the level of the inlet in the first chamber and a second outlet above the level of the first outlet, all as and for the purpose described.

HOWARD G. BADGLEY.

Witnesses:
A. G. N. VERMILYE,
D. J. PALMER HERRICK.